United States Patent
Wiest et al.

(10) Patent No.: US 9,900,313 B2
(45) Date of Patent: Feb. 20, 2018

(54) SECURE SHELL (SSH) PROXY FOR A PLATFORM-AS-A-SERVICE SYSTEM

(71) Applicant: Red Hat, Inc., Raleigh, NC (US)

(72) Inventors: Thomas Wiest, Lehi, UT (US); Clayton Coleman, Raleigh, NC (US); Andrew Goldstein, Rockville, MD (US)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 14/613,772

(22) Filed: Feb. 4, 2015

(65) Prior Publication Data

US 2016/0226874 A1 Aug. 4, 2016

(51) Int. Cl.
*H04L 29/06* (2006.01)
*H04L 29/08* (2006.01)

(52) U.S. Cl.
CPC ...... *H04L 63/0884* (2013.01); *H04L 63/0281* (2013.01); *H04L 67/141* (2013.01); *H04L 67/10* (2013.01)

(58) Field of Classification Search
CPC H04L 63/0884; H04L 63/0281; H04L 67/141
See application file for complete search history.

(56) References Cited

U.S. PATENT DOCUMENTS

| 8,065,714 | B2 | 11/2011 | Budko et al. |
| 8,286,232 | B2 | 10/2012 | Carter et al. |
| 8,327,128 | B1 | 12/2012 | Prince et al. |
| 8,374,354 | B2* | 2/2013 | Berggren ........ H04L 9/3263 380/256 |
| 2009/0083422 | A1 | 3/2009 | McKay et al. |
| 2013/0117554 | A1 | 5/2013 | Ylonen |

(Continued)

FOREIGN PATENT DOCUMENTS

WO 2013020207 A1 2/2013

OTHER PUBLICATIONS

Zheng et al, The SSH Protocol Audit System Based on Proxy Technology, IEEE, Jun 21-23, 2013.*

(Continued)

*Primary Examiner* — Luu Pham
*Assistant Examiner* — Harvey Cohen
(74) *Attorney, Agent, or Firm* — Lowenstein Sandler LLP

(57) ABSTRACT

Implementations provide for a secure shell (SSH) proxy for a Platform-as-a-Service (PaaS) system. A method of the disclosure includes receiving, by a processing device executing a Secure Shell (SSH) proxy server, a request to establish an SSH connection with a component of an application of a multi-tenant Platform-as-a-Service (PaaS) system, the component is separate from the SSH proxy server, authenticating credentials provided as part of the request, establishing the SSH connection with a device originating the request, receiving, in view of authenticating the credentials and establishing the SSH connection, routing information for the application, the routing information comprising a location of a node of the multi-tenant PaaS system executing the application, establishing an internal communication session with an executing proxy of the node, and forward information conveyed over the SSH connection to the executing proxy via the internal communication session.

20 Claims, 6 Drawing Sheets

(56) References Cited

U.S. PATENT DOCUMENTS

| | | | | |
|---|---|---|---|---|
| 2013/0298183 | A1* | 11/2013 | McGrath | G06F 9/455 726/1 |
| 2014/0059226 | A1* | 2/2014 | Messerli | G06F 9/5072 709/226 |
| 2014/0298444 | A1 | 10/2014 | Iwamatsu et al. | |
| 2014/0331049 | A1* | 11/2014 | Duby | H04L 63/08 713/171 |
| 2015/0096031 | A1* | 4/2015 | Benoit | G06F 21/53 726/24 |
| 2015/0150114 | A1* | 5/2015 | Kuker | H04L 12/4641 726/14 |
| 2015/0295824 | A1* | 10/2015 | Chopra | G06F 9/45558 709/223 |
| 2015/0304292 | A1* | 10/2015 | Dulkin | H04L 63/0281 726/7 |
| 2016/0212100 | A1* | 7/2016 | Banerjee | H04L 63/0281 |

OTHER PUBLICATIONS

Iyappan et al, Pluggable Encryption Algorithm In Secure Shell(SSH) Protocol, Emerging Trends in Engineering and Technology (ICETET), 2009 2nd International Conference on, Dec. 2009.*

Gebski et al, Protocol Identification of Encrypted Network Traffic, Web Intelligence, 2006. WI 2006. IEEE/WIC/ACM International Conference on, Dec. 18-22, 2006.*

Sugavanesh et al, SHS-HTTPS enforcer: enforcing HTTPS and preventing MITM attacks, ACM SIGSOFT Software Engineering Notes, vol. 38 Issue 6, Nov. 2013, pp. 1-4.*

"Is There a Name Based Virtual Host SSH Reverse Proxy?", http://serverfault.com/questions/34552/is-there-a-name-based-virtual-host-ssh-reverse-proxy, [retrieved from the internet on Feb. 12, 2015], 3 pages.

Gordon, Steven, "Accessing VirtualBox Guests from Host using SSH, WinSCP and Tunnelling", https://sandilands.info/sgordon/accessing-virtualbox-guests-using-ssh-winscp-tunnelling, 8 pages, Aug. 15, 2013.

OSL Wiki documentation, "Connecting to Your Virtual Machines via SSH", https://wiki.osuosl.org/supercell/connecting_via_ssh.html, [retrieved from the Internet on Feb. 12, 2015], 1 page.

* cited by examiner

500

Establish communication session from SSH proxy server to execution proxy, the communication session associated with an SSH connection between a client device and the SSH proxy server
510

Authenticate communication session via credentials associated with user corresponding to the communication session
520

Based on request received via communication session, run executable to obtain access to a component corresponding to application
530

Provide access to component of application to user on device via communication session and SSH connection
540

SECURE SHELL (SSH) PROXY FOR A PLATFORM-AS-A-SERVICE SYSTEM

TECHNICAL FIELD

The implementations of the disclosure relate generally to Platform-as-a-Service (PaaS) systems and, more specifically, relate to a secure shell (SSH) proxy for a PaaS system.

BACKGROUND

A variety of Platform-as-a-Service (PaaS) system offerings exists that include software and/or hardware facilities for facilitating the execution of web applications in a cloud computing environment (the "cloud"). Cloud computing is a computing paradigm in which a customer pays a "cloud provider" to execute a program on computer hardware owned and/or controlled by the cloud provider. It is common for cloud providers to make virtual machines (VMs) hosted on its computer hardware available to customers for this purpose.

The cloud provider typically provides an interface that a customer can use to requisition virtual machines and associated resources such as processors, storage, and network services, etc., as well as an interface a customer can use to install and execute the customer's program on the virtual machines that the customer requisitions, together with additional software on which the customer's program depends. For some such programs, this additional software can include software components, such as a kernel and an operating system, and/or middleware and a framework. Customers that have installed and are executing their programs "in the cloud" typically communicate with the executing program from remote geographic locations using Internet protocols.

PaaS offerings facilitate deployment of web applications without the cost and complexity of buying and managing the underlying hardware and software and provisioning hosting capabilities, providing the facilities to support the complete life cycle of building and delivering web applications and services entirely available from the Internet. Typically, these facilities operate as one or more VMs running on top of a hypervisor in a host server.

BRIEF DESCRIPTION OF THE DRAWINGS

The disclosure will be understood more fully from the detailed description given below and from the accompanying drawings of various implementations of the disclosure. The drawings, however, should not be taken to limit the disclosure to the specific implementations, but are for explanation and understanding only.

FIG. 5 is a flow diagram illustrating a method for establishing a communication connection between an SSH proxy server and an executing proxy in a multi-tenant PaaS system according to an implementation of the disclosure.

DETAILED DESCRIPTION

Implementations of the disclosure provide for a secure shell (SSH) proxy for a Platform-as-a-Service (PaaS) system. Implementations of the disclosure introduce an SSH proxy server that provides a statically-addressable location for users of the PaaS system to access their applications and/or application repositories hosted by the PaaS via SSH connection, while forwarding the SSH connection to dynamically-placed environments of the PaaS system. SSH is a cryptographic network protocol for secure data communication, remote command-line login, remote command execution, and other secure network services between two networked computing devices. SSH connects, via a secure channel over an insecure network, a server and a client running SSH server and client programs, respectively.

The dynamically-placed environments of implementations of the disclosure may include applications of the PaaS system hosted by nodes. The applications may move between nodes for a variety of reasons, including failure of the node, load balancing purposes, and so on. In implementations of the disclosure, the address a user utilizes to access the SSH proxy server in order to establish the SSH connection to the application remains the same, while the actual endpoint communication connection to the application is dynamic.

SSH proxy server may communicate with PaaS master component for authentication, authorization, and routing purposes. In addition, the SSH proxy server may communicate with an executing proxy on each node of the PaaS system. The executing proxy may be a process running on the node that communicates with SSH proxy server. When the SSH proxy server establishes a connection with the executing proxy running on the node, the SSH proxy server forwards any requests sent over the SSH connection from the client to the executing proxy. The executing proxy may then execute the requested process made by the user via the SSH connection. In some implementations, the SSH proxy server and the executing proxy may communicate using a communication connection protocol that is different than SSH.

Previous solutions generally have not provided a SSH proxy for a multi-tenant PaaS environment. Current SSH proxy solutions typically do not offer a solution for a statically-addressable SSH connection that simultaneously routes the communication to a dynamically-placed environment within the PaaS system. Implementations of the disclosure provide an SSH proxy usable in a multi-tenant environment by introducing an SSH proxy server including functionality to communicate with executing proxies at each node in the system in order to access components of the applications running on the nodes in the PaaS system.

Figure 1:
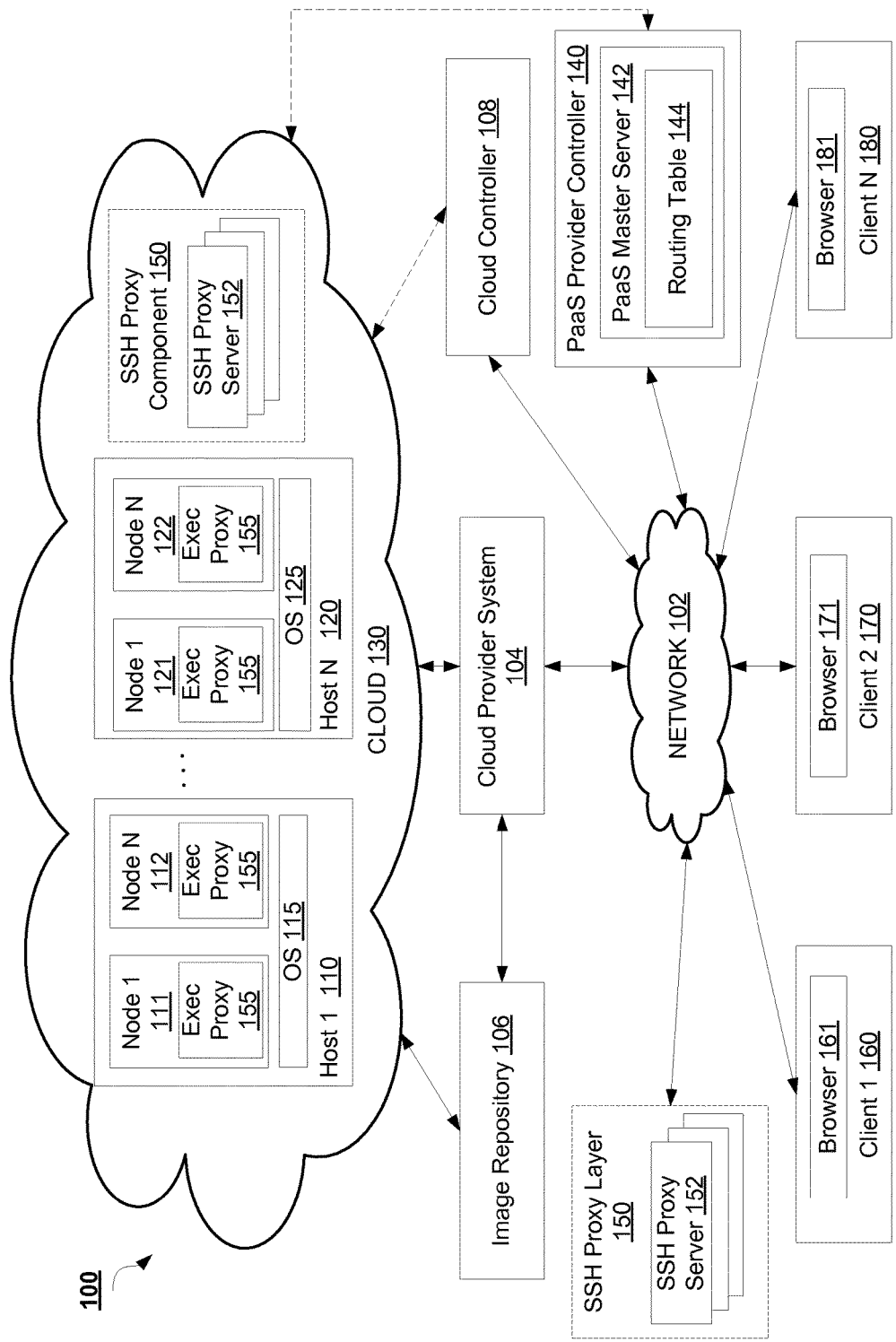
FIG. 1 is a block diagram of a network architecture in which implementations of the disclosure may operate.

FIG. 1 is a block diagram of a network architecture 100 in which implementations of the disclosure may operate. The network architecture 100 includes a cloud 130 managed by a cloud provider system 104. The cloud provider system 104 provides nodes 111, 112, 121, 122 to execute software and/or other processes. In some implementations these nodes are virtual machines (VMs) that are hosted on a physical machine, such as host 1 110 through host N 120, configured as part of the cloud 130. In some implementations, the host machines 110, 120 are often located in a data center. For example, nodes 111 and 112 are hosted on physical machine 110 in cloud 130 provided by cloud provider 104. When nodes 111, 112, 121, 122 are implemented as VMs, they may be executed by OSes 115, 125 on each host machine 110, 120. Users can interact with applications executing on the cloud-based nodes 111, 112, 121, 122 using client computer systems, such as clients 160, 170 and 180, via corresponding web browser applications 161, 171 and 181.

In some implementations, the host machines 110, 120 are often located in a data center. In other implementations, the applications may be hosted directly on hosts 1 through N 110, 120 without the use of VMs (e.g., a "bare metal" implementation), and in such an implementation, the hosts themselves are referred to as "nodes".

Clients 160, 170, and 180 are connected to hosts 110, 120 in cloud 130 and the cloud provider system 104 via a network 102, which may be a private network (e.g., a local area network (LAN), a wide area network (WAN), intranet, or other similar private networks) or a public network (e.g., the Internet). Each client 160, 170, 180 may be a mobile device, a PDA, a laptop, a desktop computer, a tablet computing device, a server device, or any other computing device. Each host 110, 120 may be a server computer system, a desktop computer or any other computing device. The cloud provider system 104 may include one or more machines such as server computers, desktop computers, etc.

In one implementation, the cloud provider system 104 is coupled to a cloud controller 108 via the network 102. The cloud controller 108 may reside on one or more machines (e.g., server computers, desktop computers, etc.) and may manage the execution of applications in the cloud 130. In some implementations, cloud controller 108 receives commands from PaaS system controller 140. Based on these commands, the cloud controller 108 provides data (e.g., such as pre-generated images) associated with different applications to the cloud provider system 104. In some implementations, the data may be provided to the cloud provider 104 and stored in an image repository 106, in an image repository (not shown) located on each host 110, 120, or in an image repository (not shown) located on each VM 111, 112, 121, 122. This data may be used for the execution of applications for a multi-tenant PaaS system managed by the PaaS provider controller 140.

Upon receiving a command identifying specific data (e.g., application data and files used to initialize an application on the cloud), the cloud provider 104 retrieves the corresponding data from the image repository 106, creates an instance of it, and loads it to the host 110, 120 for execution by nodes 111, 112, 121, 122. In addition, a command may identify specific data to be executed on one or more of the nodes 111, 112, 121, and 122. The command may be received from the cloud controller 108, from the PaaS system controller 140, or a user (e.g., a system administrator) via a console computer or a client machine. The image repository 106 may be local or remote and may represent a single data structure or multiple data structures (databases, repositories, files, etc.) residing on one or more mass storage devices, such as magnetic or optical storage based discs, solid-state-drives (SSDs) or hard drives.

In one implementation, the PaaS provider controller 140 manages an SSH proxy layer 150. SSH proxy layer 150 may include a pool of one or more SSH proxy servers 152. The SSH proxy servers 152 may be a hosted by cloud 130. For example, SSH proxy servers 152 may be hosted on any of host machines 110, 120, or may be hosted separately. In some implementations, SSH proxy servers 152 may optionally be implemented outside of cloud 130 and hosted on a server device connected to network 102, or implemented on a client device, such as clients 160, 170, and 180 (not shown).

SSH proxy server 152 provides a statically-addressable location for users of the PaaS system to access their applications and/or application repositories hosted by the PaaS via SSH connection, while forwarding the SSH connection to dynamically-placed environments of the PaaS system. For example, an application of the PaaS may be hosted by node 1 111 on host 1 110 until the node 1 111 or host 1 110 goes down, and then the application may be hosted by node N 122 on host N 120. In this situation, the address a user utilizes to establish the SSH connection to the application remains the same (the static address to SSH proxy server 152), while the actual SSH connection to the application is dynamic.

SSH proxy server 152 may communicate with PaaS master server 142 of the PaaS provider controller 140. SSH proxy server 152 may interact with the PaaS master server 142 for authentication, authorization, and routing purposes. The PaaS master server 142 may include a routing table 144, which contains information relating to containers (which are resource-constrained process spaces), running on nodes 111, 112, 121, 122, or any combination thereof, corresponding to a multi-tenant PaaS application (discussed below).

Specifically, routing table 144 may contain endpoint information for each of the containers. Endpoint information describes a location of a container and/or a role of the container, and may include one or more of an endpoint DNS entry of the container, a port number, a hostname of a host server of the container, a role of the container (e.g., how the container is to be utilized by the application), a protocol (e.g., Hypertext Transfer Protocol (HTTP), Hypertext Transfer Protocol Secure (HTTPS), Transmission Control Protocol (TCP), Git, Secure Shell (SSH), or a MySQL protocol), or information related to endpoints of other container (e.g., locations of other containers to which traffic is to be routed). The endpoint information is utilized by the SSH proxy server 152 to forward SSH connections to destination container(s) corresponding to the application. Further details of SSH proxy server 152 and its interactions with the PaaS master server 142 for authorization, authentication, and routing purposes in a multi-tenant PaaS system are described further below.

In one implementation, nodes 111, 112, 121, 122 include an executing proxy 155. The executing proxy 155 can be implemented on each of the nodes 111, 112, 121, 122 of the PaaS system or, alternatively, on a subset of the nodes 111, 112, 121, 122. In one implementation, the executing proxy 155 is a process (e.g., that may be running as a container) that communicates with SSH proxy server 152. When SSH proxy server 152 identifies the endpoint information of the container to be accessed via the SSH connection, it establishes a connection with the executing proxy 155 running on the target endpoint node 111, 112, 121, 122. Once the executing proxy 155 receives a request from the SSH proxy server 152, it executes the requested process made by the user via the SSH connection. The SSH proxy server 152 and the executing proxy 155 may communicate using a communication connection protocol that is different than SSH, such as a communication protocol internal to the PaaS system. Further details of SSH proxy server 152, executing proxy 155, and their related workflows can be found below with respect to FIGS. 2 through 5.

While various implementations are described in terms of the environment described above, those skilled in the art will appreciate that the facility may be implemented in a variety of other environments including a single, monolithic computer system, as well as various other combinations of computer systems or similar devices connected in various ways. For example, the data from the image repository 106 may run directly on a physical host 110, 120 instead of being instantiated on nodes 111, 112, 121, 122. In some implementations, an environment other than a VM may be used to execute functionality of PaaS applications. As such, in some implementations, a "node" providing computing functionality may provide the execution environment for an application of the PaaS system. The "node" may refer to a VM or any other type of computing environment.

Figure 2:
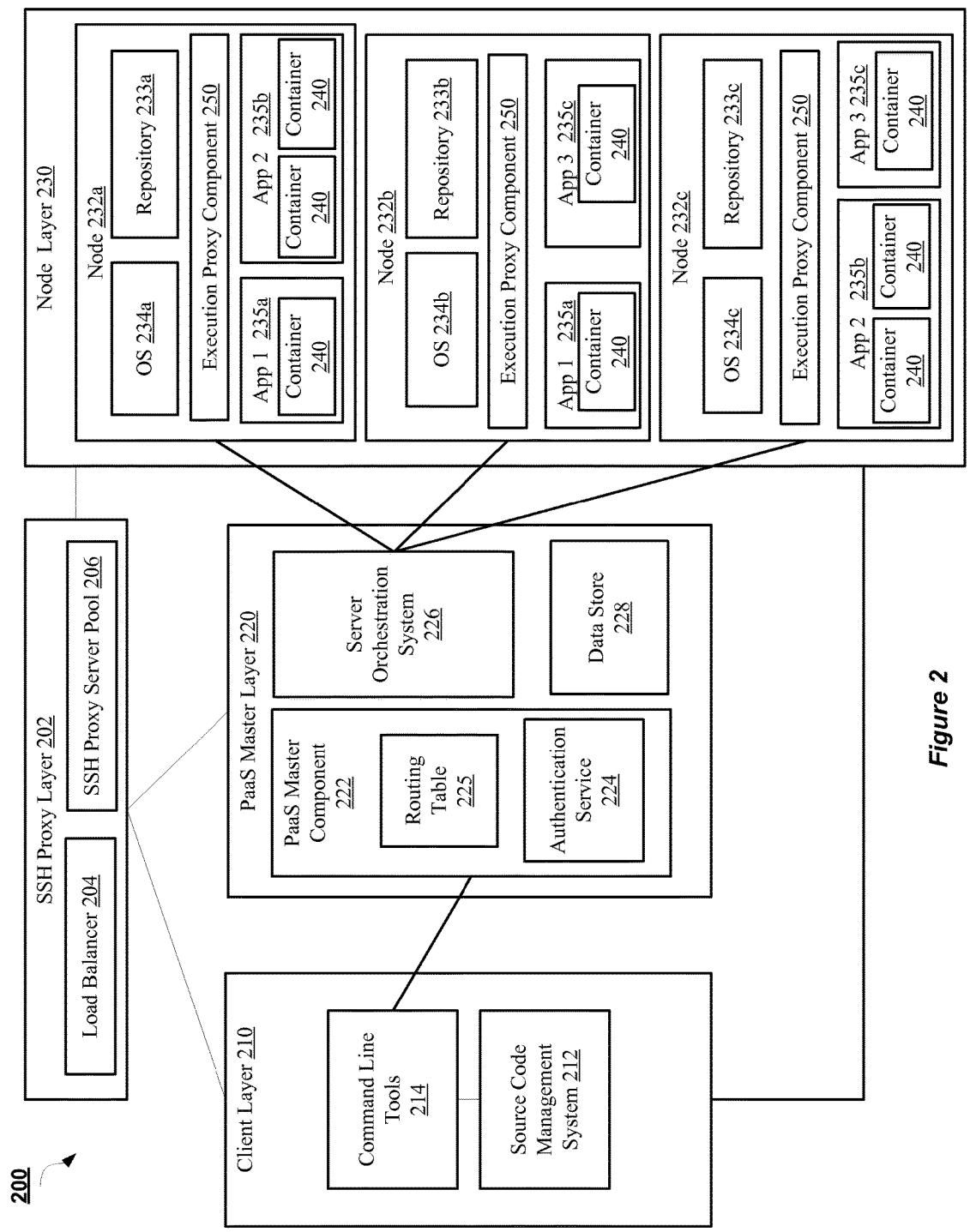
FIG. 2 is a block diagram of a multi-tenant Platform-as-a-Service (PaaS) system architecture according to an implementation of the disclosure.

FIG. 2 is a block diagram of a multi-tenant PaaS system architecture 200 according to an implementation of the disclosure. The PaaS architecture 200 allows users to launch software applications in a cloud computing environment, such as cloud computing environment provided in network architecture 100 described with respect to FIG. 1. The PaaS system architecture 200, in one implementation, includes a client layer 210, a PaaS master layer 220, and a node layer 230.

In one implementation, the components of the PaaS system architecture are in communication with each other via a network (not shown). The network may include, for example, the Internet in one implementation. In other implementations, other networks, wired and wireless, such as an intranet, local area network (LAN), wide area network (WAN), or broadcast network may be used.

In one implementation, the client layer 210 resides on a client machine, such as a workstation of a software developer, and provides an interface to a user of the client machine to the PaaS master layer 220 of the PaaS system 200. In one implementation, the client machine can be a client 160, 170, 180 described with respect to FIG. 1. The PaaS master layer 220 may facilitate the creation and deployment on the cloud (via node layer 230) of software applications being developed by an end user at client layer 210.

In one implementation, the client layer 210 includes a source code management system 212, sometimes referred to as "SCM" or revision control system. One example of such an SCM or revision control system is Git, available as open source software. Another example of an SCM or revision control system is Mercurial, also available as open source software. Git, Mercurial, and other such distributed SCM systems typically include a working directory for making changes, and a local software repository for storing the changes for each application associated with the end user of the PaaS system 200. The packaged software application can then be "pushed" from the local SCM repository to a remote SCM repository, such as repositories 233a, 233b, 233c, at the node(s) 232a, 232b, 232c running the associated application. From the remote SCM repository 233a, 233b, 233c, the code may be edited by others with access, or the application may be executed by a machine. Other SCM systems work in a similar manner.

The client layer 210, in one implementation, also includes a set of command line tools 214 that a user can utilize to create, launch, and manage applications. In one implementation, the command line tools 214 can be downloaded and installed on the user's client machine, and can be accessed via a command line interface or a graphical user interface, or some other type of interface. In one implementation, the command line tools 214 expose an application programming interface ("API") of the PaaS master layer 220 and perform other applications management tasks in an automated fashion using other interfaces, as will be described in more detail further below in accordance with some implementations.

In one implementation, the PaaS master layer 220 acts as middleware between the client layer 210 and the node layer 230. The node layer 230 includes the nodes 232a-c on which applications 235a-c are provisioned and executed. In one implementation, each node 232a-c is a VM. In some implementations, the VMs are provisioned by an Infrastructure as a Service (IaaS) provider. In other implementations, the nodes 232a-c may be physical machines or VMs residing on a single physical machine. In one implementation, the PaaS master layer 220 is implemented on one or more machines, such as server computers, desktop computers, etc. In some implementations, the PaaS master layer 220 may be implemented on one or more machines separate from machines implementing each of the client layer 210 and the node layer 230, or may be implemented together with the client layer 210 and/or the node layer 230 on one or more machines, or some combination of the above.

In one implementation, the PaaS master layer 220 includes a PaaS master component 222 that coordinates requests from the client layer 210 with actions to be performed at the node layer 230. Examples of the requests can include a request to create an application, a request to perform an action on a container (e.g., creating, removing, and/or managing a container), a request to deploy source code of an application, a request to designate a system to host a remote SCM repository (e.g., an indication that a system has been designated by a user to host a remote SCM repository), etc.

In one implementation, a user, using the command line tools 214 at client layer 210, can request the creation of a new application 235a-c, deployment of source code of the application 235a-c, the designation of a system that hosts a remote SCM repository, etc. In response to receiving such a request, the PaaS master component 222 may first authenticate the user using an authentication service 224. In one implementation, the authentication service 224 may comprise custom authentication methods, or standard protocols such as SAML, Oauth, etc. Once the user has been authenticated and allowed access to the system by authentication service 224, the PaaS master component 222 uses a server orchestration system 226 to collect information and configuration information about the nodes 232a-c.

The server orchestration system 226, in one implementation, functions to coordinate server-client interaction between multiple (sometimes a large number of) servers. In one implementation, the servers being orchestrated are nodes 232a-c, which are acting as application servers and web servers.

In one implementation, the PaaS master component 222 manages the business logic and model representing the nodes 232a-c and the applications 235a-c residing on the nodes, and acts as a controller that generates the actions requested by users via an API of the command line tools 214. The server orchestration system 226 then takes the actions generated by the PaaS master component 222 and orchestrates their execution on the many nodes 232a-c managed by the system.

In one implementation, the information collected about the nodes 232a-c can be stored in a data store 228. In one implementation, the data store 228 can be a locally-hosted database or file store, or it can be a cloud-based storage service provided by a Software-as-a-Service (SaaS) provider. The PaaS master component 222 uses the information about the nodes 232a-c and their applications 235a-c to model the application hosting service and to maintain records about the nodes. In one implementation, data of a node 232a-c is stored in the form of a JavaScript™ Object Notation (JSON) blob or string that maintains key-value pairs to associate a unique identifier, a hostname, a list of applications, and other such attributes with the node.

In implementations of the disclosure, the PaaS system architecture 200 of FIG. 2 is a multi-tenant PaaS environment. In a multi-tenant PaaS environment, each node 232a-c runs multiple applications 235a-c that may be owned or managed by different users and/or organizations. As such, a first customer's deployed applications 235a-c may co-exist with any other customer's deployed applications on the same node 232 that is hosting the first customer's deployed applications 235a-c. In some implementations, portions of an application execute on multiple different nodes 232a-c. For example, as shown in FIG. 2, components of application 1 235a run in both node 232a and node 232b. Similarly, components of application 2 235b may run in node 232b and node 232c.

In one implementation, each node 232a-c is implemented as a VM and has an operating system 234a-c that can execute applications 235a-c using the repositories 233a-c that are resident on the nodes 232a-c. Each node 232a-c also includes a server orchestration system agent (not shown) configured to track and collect information about the node 232a-c and to perform management actions on the node 232a-c. The server orchestration system agent may operate in tandem with the server orchestration system 226 to send requests, queries, and commands between the node 232a-c and the PaaS master layer 220.

Nodes 232a-c may execute applications 235a-c using images corresponding to the applications 235a-c, where the application images are launched as containers 240. An image refers to data representing executables and files of an application used to deploy functionality for a runtime instance of the application. Each application image may map to a functional component of the application 235a-c. As such, an application may have more than one application image associated with the application. The application images include support software providing functionality (e.g., configuration templates, scripts, dependencies, etc.) used to run the application 235a-c and/or add a feature to the application 235a-c. For example, the images may support languages such as, but not limited to, JBoss™, PHP, Ruby, Python, Perl, and so on. In addition, application images may be generated that support databases, such as MySQL™, PostgreSQL™, Mongo™, and others. Application images may also be generated that support the build and continuous integration environments, such as a Jenkins-based image. Lastly, application images may be generated to support management capabilities and/or tools, such as PHPmyadmin, RockMongo™, 10gen-mms-agent, cron scheduler, HAProxy, Maven, and Gradle, for example.

A container 240 refers to a resource-constrained process space on the node 232a-c to execute functionality (e.g., an application image) of an application 235a-c. In some implementations, a container 240 is established by the node 232a-c with resource boundaries, including a limit and/or designation of the amount of memory, amount of storage, and security types and/or labels to be applied to any functions executed by the container 240. In one implementation, containers 240 may be established using the Linux Containers (LXC) method. In further implementations, containers 240 may also be established using cgroups, SELinux™, and kernel namespaces, to name a few examples.

In one implementation, the multi-tenant PaaS system may include an SSH proxy layer 202. SSH proxy layer 150 may include a SSH proxy server pool 206 of one or more SSH proxy servers. The SSH proxy layer 202 may be the same as SSH proxy layer 150 described with respect to FIG. 1 and the SSH proxy server pool 206 may include the SSH proxy server 152 described with respect to FIG. 1. As discussed above, SSH proxy servers in SSH proxy server pool 206 provide a statically-addressable location for users of the multi-tenant PaaS system to access their applications 235a-c and/or application repositories 233a-c hosted by the PaaS via SSH connection. For example, a user may establish an SSH connection at client layer 210 using command line tools 214. In the following description, an individual SSH proxy server from the SSH proxy server pool may be referred to as SSH proxy server 206.

In some implementations, a user utilizes a static Uniform Resource Locator (URL) to establish an SSH connection with the SSH proxy layer 202. In one implementation, the user is directed through a load balancer 204 that determines an SSH proxy server from the SSH proxy server pool 206 to receive the user's SSH request. Providing an SSH proxy server pool 206 of SSH proxy servers provides redundancy and fail over capabilities to the SSH proxy layer 202 of the multi-tenant PaaS system. When the SSH proxy server 206 receives the SSH request from the user (e.g., via load balancer 204), it may then communicate with PaaS master layer 220. Specifically, the SSH proxy server 206 may interact with the PaaS master component 222 for authentication, authorization, and routing purposes.

In one implementation, the user may provide a unique username as part of the initial SSH URL request. This unique username, as well as other information gleaned from the SSH login process (e.g., SSH key) is used by the SSH proxy server 206 to communicate with the PaaS master component 222 to authenticate the user.

After the authentication succeeds, the SSH proxy server 206 communicates with the PaaS master component 222 to determine the appropriate target destination for the SSH connection. The PaaS master component 222 may include a routing table 225, which contains information relating to containers 240 running on nodes 232a-c. PaaS master component 222 may be the same as PaaS master server 144 and routing table 225 may the same as routing table 144, both described with respect to FIG. 1.

As described above, routing table 225 may contain endpoint information for each of the containers 240. Endpoint information describes a location of a container and/or a role of the container, and may include one or more of an endpoint DNS entry of the container, a port number, a hostname of a host server of the container, a role of the container (e.g., how the container is to be utilized by the application), a protocol (e.g., Hypertext Transfer Protocol (HTTP), Hypertext Transfer Protocol Secure (HTTPS), Transmission Control Protocol (TCP), Git, Secure Shell (SSH), or a MySQL protocol), or information related to endpoints of other container (e.g., locations of other container to which traffic is to be routed).

In one implementation, the endpoint information is utilized by the SSH proxy server 206 to forward the SSH connection to a destination container 240 or repository 233a-c corresponding to the user's application 235a-c. Nodes 232a-c may include an executing proxy 250 to communicate with the SSH proxy server. The executing proxy may be the same as executing proxy 155 described with respect to FIG. 1. In one implementation, the executing proxy 250 is a process (e.g., a Docker™ exec proxy) that communicates with SSH proxy server 206. When SSH proxy server 206 identifies the endpoint information of the container 240 to be accessed via the SSH connection, it establishes a connection with the executing proxy 250 running on the target endpoint node 232*a-c*. Once the executing proxy 250 receives a request from the SSH proxy server 206, it executes the process requested by the user via the SSH connection. In some implementations, the SSH proxy server 206 and the executing proxy 250 communicate using a communication connection protocol that is different than SSH, such as a SPDY protocol, or any custom protocol developed specifically for the multi-tenant PaaS system. The SSH proxy server 206 would then translate between SSH and the internal communication protocol.

Figure 3:
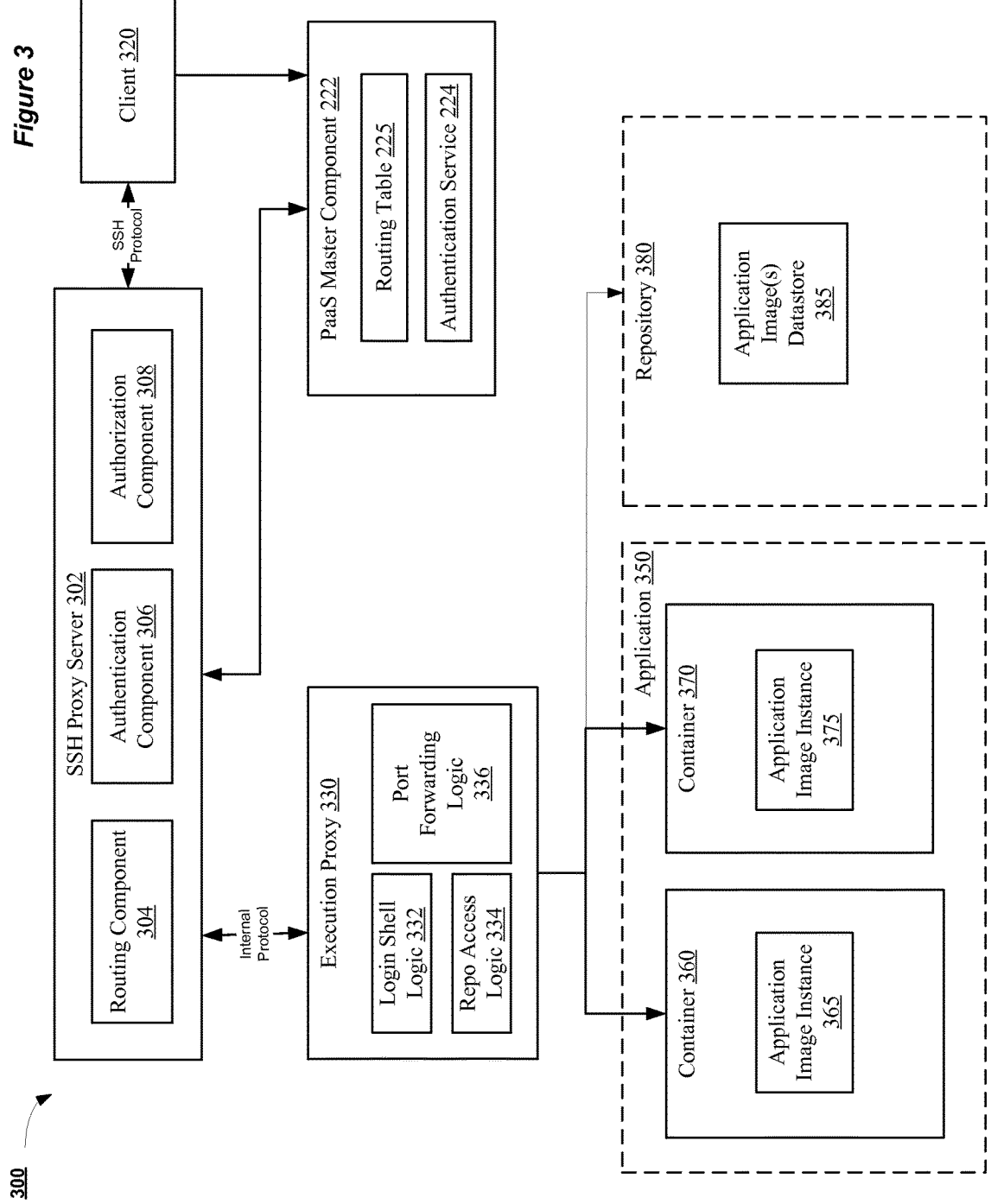
FIG. 3 is a block diagram of a communication architecture of a multi-tenant PaaS providing a Secure Shell (SSH) proxy server according to an implementation of the disclosure.

FIG. 3 is a block diagram of a communication architecture 300 of a multi-tenant PaaS providing an SSH proxy for applications of the multi-tenant PaaS system according to an implementation of the disclosure. Architecture 300 includes the PaaS master component 222, a client 320, and an SSH proxy server 302 in communicative connection with each other. In one implementation, PaaS master component 222, client 320 and SSH proxy server 302 are the same as their counterparts described with respect to FIG. 2.

In one implementation, client 320 connects to SSH proxy server 302 using a SSH protocol. Client 320 may access SSH proxy server 302 using a static URL provided to a user at the client 320 when the user registers with the multi-tenant PaaS system via PaaS master component 222. The user may register one or more applications 350 via the PaaS master component 222.

As part of establishing an SSH connection between client 320 and SSH proxy server 302, client 320 may provide a username and other identifying information, such as an SSH key, to the SSH proxy server 302. An authentication component 306 of SSH proxy server 302 may utilize this information to authenticate the user at the PaaS master component 222. For example, the authentication component 306 may validate the user's provided credentials via an authentication service 224 of the PaaS master component 222.

After the authentication succeeds, an authorization component 308 of the SSH proxy server 302 communicates with the PaaS master component 222 to determine an appropriate target destination for the SSH connection. The PaaS master component 222 may reference a routing table 225 to determine if the user is authorized to access one or more containers 360, 370 (launched using application image instances 365, 375) of the application 350 corresponding to the authenticated username. If so, the PaaS master component 222 utilizes the routing table 225 to determine the destination node where the target container 360, 370 is located.

Routing component 304 of SSH proxy server 302 then utilizes the endpoint information provided by the PaaS master component 222 to forward the SSH connection to the destination container 360, 370 or repository 380 corresponding to the user's application 350. As part of forwarding the connection, the SSH proxy server 302 opens a new connection to an executing proxy 330 on the destination node. The executing proxy 330 may be the same as its counterparts described with respect to FIGS. 1 and 2.

In one implementation, the SSH proxy server 302 authenticates the user to the execution proxy 330. However, when the SSH connection authentication succeeds at the authentication component 306, the SSH proxy server 302 no longer maintains the user's credentials (e.g., password, public key, Kerberos, etc.). To work around this, in some implementations, a custom module, such as a PAM module, can be written and added to the authentication component 306 of SSH proxy server 302 to retrieve a unique token for the user from the PaaS master component 222 and store it in environment variables maintained by the SSH proxy server 302 for the SSH connection with client 320. This token in the environment variables may be used when authenticating on behalf of the user to the executing proxy 330. As long as the SSH proxy server 302 maintains unique MCS label and execution context for each process associated with each SSH connection, other processes in the SSH proxy server 302 should not be able to snoop the environment variables of distinct other processes in the SSH proxy server 302.

Once the executing proxy 330 receives a request from the SSH proxy server 302, it executes the process requested by the user via the SSH connection. In some implementations, the SSH proxy server 302 and the executing proxy 330 communicate using a communication connection protocol that is different than SSH, such as a SPDY protocol, or any custom protocol developed specifically for the multi-tenant PaaS system.

In one implementation, when the request is to obtain shell access to the application 350 (e.g., containers 360 or 370 of application 350), then login shell logic 332 of execution proxy 330 generates executable instructions for the container 360, 370 to execute a login shell to give the user terminal or command line access to the application's 350 container 360, 370. In another implementation, when the request is to obtain access to a repository 380 corresponding to the application 350, then repo access logic 334 of the executing proxy 330 generates executable instructions to give the user access to the application source code associated with the application 350 stored in a source code repository. In a further implementation, when the request is to implement port forwarding for the application 350, then port forwarding logic 336 of the executing proxy 330 generates executable instructions to give the cause the port forwarding to occur in association with the container 360, 370 of the application 350.

Figure 4:
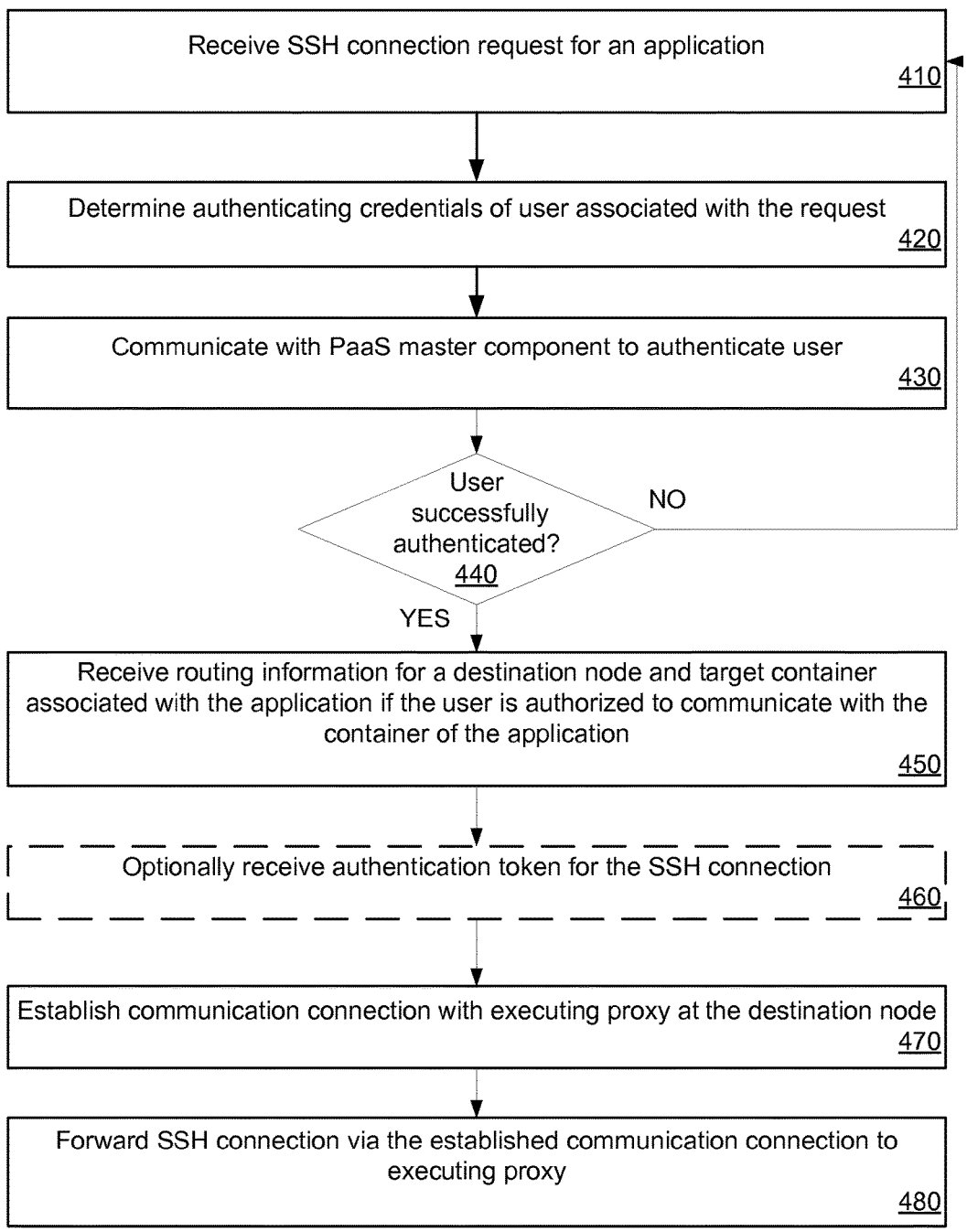
FIG. 4 is a flow diagram illustrating a method for establishing an SSH connection with an SSH proxy server in a multi-tenant PaaS system according to an implementation of the disclosure.

FIG. 4 is a flow diagram illustrating a method 400 for establishing an SSH connection with an SSH proxy server in a multi-tenant PaaS system according to an implementation of the disclosure. Method 400 may be performed by processing logic that may comprise hardware (e.g., circuitry, dedicated logic, programmable logic, microcode, etc.), software (such as instructions run on a processing device), firmware, or a combination thereof. In one implementation, method 400 is performed by SSH proxy server 206, 302 of FIGS. 2 and 3.

Method 400 begins at block 410 where an SSH connection request is received for an application of the multi-tenant PaaS system. In one implementation, the SSH connection request is received at a SSH proxy server accessed via a static URL provided to a user sending the request. At block 420, authenticating credentials of the user associated with the request are determined. In one implementation, the authenticating credentials are received as part of the SSH connection request and/or as part of a handshake procedure of the SSH connection request. The authenticating credentials may include a username of the user, an SSH key of the user, and so on.

Subsequently, at block 430, the SSH proxy server communicates with a PaaS master component in order to authenticate the user with the determined authenticating credentials. At decision block 440, it is determined whether the user was successfully authenticated by the PaaS master component. If not, then method 400 ends and returns to block 410 to start over. If the user is successfully authenticated at decision block 440, then method 400 proceeds to block 450 where routing information for a destination node and target container associated with the application are received. In one implementation, the routing information is provided to the SSH proxy server when the PaaS master component determines that the user is authorized to access the application and/or container of the application.

At block 460, the SSH proxy server may optionally receive an authentication token associated with the SSH connection. The authentication token may be different than the determined credentials and are used by the SSH proxy server when authenticating on behalf of the user to a node hosting the application. At block 470, a communication connection is established by the SSH proxy server with an executing proxy at the destination node. In one implementation, the executing proxy is a process running on the destination node that can receive communication requests from the SSH proxy server and cause executables to run on the node providing access to components of the application per a request of the SSH connection.

Lastly, at block 480, the SSH connection is forwarded to the executing proxy via the established communication connection. In one implementation, the communication connection is established in a communication protocol that is different than SSH. As such, the SSH proxy server translates the SSH request to the protocol of the communication connection in order to forward the SSH connection.

FIG. 5 is a flow diagram illustrating a method 500 for establishing a communication connection between an SSH proxy server and an executing proxy in a multi-tenant PaaS system according to an implementation of the disclosure. Method 500 may be performed by processing logic that may comprise hardware (e.g., circuitry, dedicated logic, programmable logic, microcode, etc.), software (such as instructions run on a processing device), firmware, or a combination thereof. In one implementation, method 500 is performed by executing proxy 250, 330 of FIGS. 2 and 3.

Method 500 begins at block 510 where a communication session is established from an SSH proxy server to the execution proxy. In one implementation, the communication session is associated with an SSH connection already established between the SSH proxy server and a client device. At block 520, the communication session is authenticated via credentials associated with a user corresponding to the communication session. In one implementation, the credentials include a token provided by the SSH proxy server for the communication session, where the token originated from a PaaS master component that authenticated the user as part of the SSH connection.

At block 530, the executing proxy runs an executable to obtain access to a component (e.g., a container or a repository) corresponding to an application associated with the SSH connection. In one implementation, the executable is run based on a request received via the communication session that originated with the SSH connection. Lastly, at block 540, access to the component of the application is provided via the communication session, which in turn is provided to the user via the SSH connection at the SSH proxy server.

Figure 6:
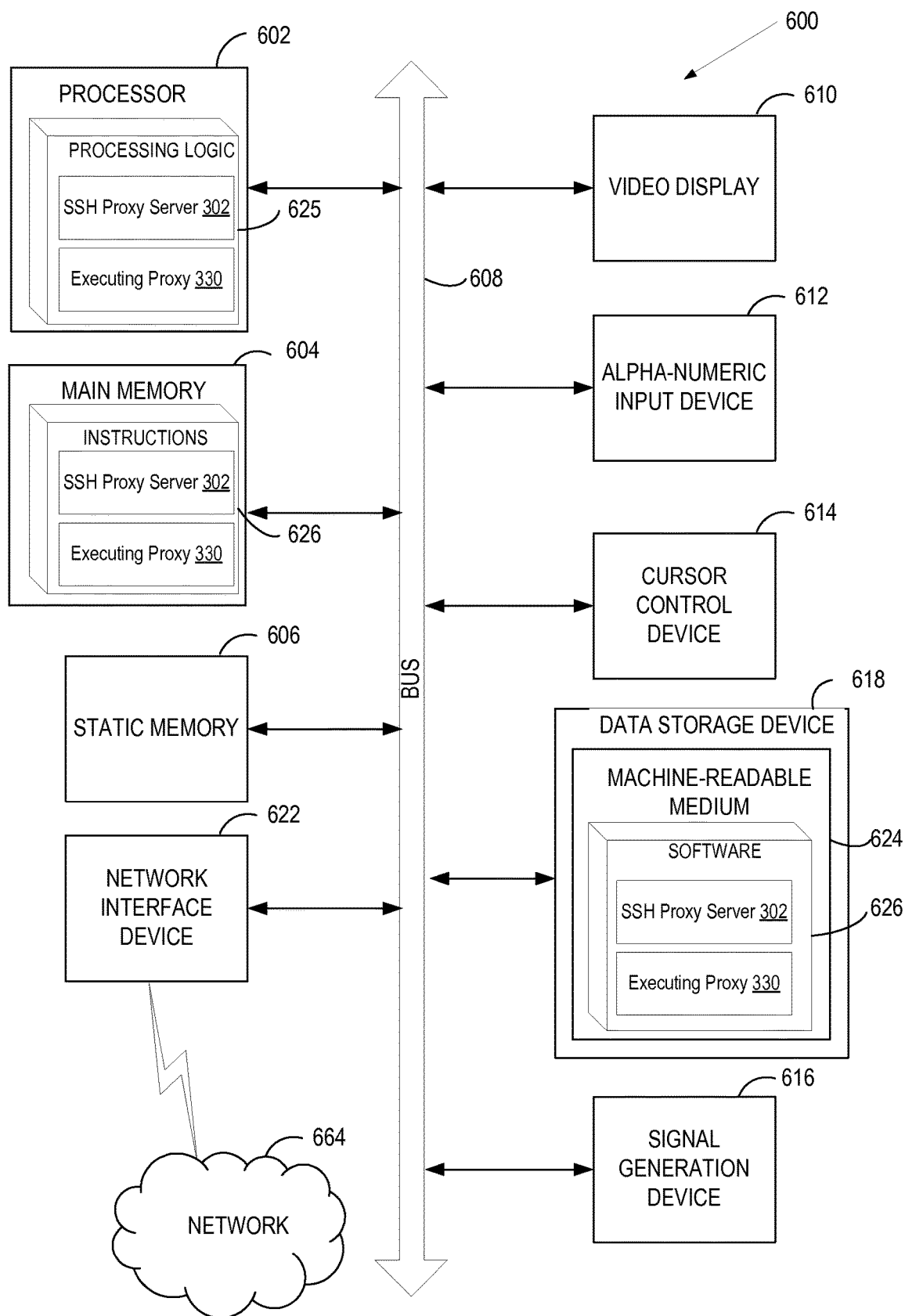
FIG. 6 illustrates a block diagram of one implementation of a computer system.

FIG. 6 illustrates a diagrammatic representation of a machine in the example form of a computer system 600 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 600 includes a processing device 602, a main memory 604 (e.g., read-only memory (ROM), flash memory, dynamic random access memory (DRAM) (such as synchronous DRAM (SDRAM) or DRAM (RDRAM), etc.), a static memory 606 (e.g., flash memory, static random access memory (SRAM), etc.), and a data storage device 618, which communicate with each other via a bus 630.

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute the processing logic 626 for performing the operations and steps discussed herein.

The computer system 600 may further include a network interface device 622 communicably coupled to a network 620. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a machine-accessible storage medium 624 on which is stored software 626 embodying any one or more of the methodologies of functions described herein. The software 626 may also reside, completely or at least partially, within the main memory 604 as instructions 626 and/or within the processing device 602 as processing logic 626 during execution thereof by the computer system 600; the main memory 604 and the processing device 602 also constituting machine-accessible storage media.

The machine-readable storage medium 624 may also be used to store instructions 626 to implement an SSH proxy server 302 and an executing proxy 330 to provide an SSH proxy for a PaaS system in a computer system, such as the computer system described with respect to FIG. 1, and/or a software library containing methods that call the above applications. While the machine-accessible storage medium 624 is shown in an example implementation to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

In the foregoing description, numerous details are set forth. It will be apparent, however, that the disclosure may be practiced without these specific details. In some instances, well-known structures and devices are shown in block diagram form, rather than in detail, in order to avoid obscuring the disclosure.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", "referencing", "determining", "authenticating", "establishing", "forwarding" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the disclosure is not described with reference to any particular programming language. It will be appreciated that a variety of programming languages may be used to implement the teachings of the disclosure as described herein.

The disclosure may be provided as a computer program product, or software, that may include a machine-readable medium having stored thereon instructions, which may be used to program a computer system (or other electronic devices) to perform a process according to the disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

The terms "first", "second", "third", "fourth", etc. as used herein are meant as labels to distinguish among different elements and may not necessarily have an ordinal meaning according to their numerical designation.

Whereas many alterations and modifications of the disclosure will no doubt become apparent to a person of ordinary skill in the art after having read the foregoing description, it is to be understood that any particular implementation shown and described by way of illustration is in no way intended to be considered limiting. Therefore, references to details of various implementations are not intended to limit the scope of the claims, which in themselves recite only those features regarded as the disclosure.

What is claimed is:

1. A method, comprising:
providing, by a processing device executing a Secure Shell (SSH) proxy server, a static uniform resource locator (URL) to a user associated with an application of a multi-tenant Platform-as-a-Service (PaaS) system, the static URL provided in response to the user registering the application with the multi-tenant PaaS system;

receiving, by the processing device, a request to establish an SSH connection with a component of the application, the component separate from the SSH proxy server, wherein the request to establish the SSH connection comprises the static URL;

authenticating, by the processing device via the SSH proxy server, credentials provided as part of the request, the authenticating further comprising retrieving a first token associated with a user corresponding to the request and storing the first token in environment variables maintained by the SSH proxy server for the SSH connection;

establishing the SSH connection with a device originating the request, wherein the SSH connection comprises the static URL utilized by the device to communicate with the component via the SSH proxy server;

receiving, by the processing device via the SSH proxy server in view of authenticating the credentials and establishing the SSH connection, routing information for the component of the application from a PaaS master component, the routing information comprising endpoint information of the component of the application, wherein the endpoint information comprises identification of a target node hosting the component in the multi-tenant PaaS system, and wherein the endpoint information changes when the component is hosted by a different node of the multi-tenant PaaS system while the static address remains the same;

receiving a second token corresponding to the SSH connection, wherein the second token is different from the first token and is used to authenticate the user to the target node;

in view of successful authentication of the user to the target node using the second token, establishing, by the processing device via the SSH proxy server, an internal communication session with an executing proxy of the target node, wherein the executing proxy is executed on the target node separate from the component; and forwarding information conveyed over the SSH connection to the executing proxy via the internal communication session.

2. The method of claim 1, wherein authenticating the credentials comprising communicating with the PaaS master component to authenticate the credentials and utilizing the first token to authenticate the user to the executing proxy.

3. The method of claim 2, wherein the routing information is sent from the PaaS master component when the PaaS master component determines that a user associated with the credentials is authorized to access the component of the application.

4. The method of claim 1, wherein the component of the application is a container executing on the target node of the multi-tenant PaaS system, the container launched from an application image providing functionality of the application.

5. The method of claim 1, wherein the component of the application is source code of the application stored in a repository.

6. The method of claim 1, wherein the executing proxy comprises a process executing on the target node, the process to run one or more executables to provide access to the component of the application on the target node.

7. The method of claim 1, wherein the internal communication session utilizes a communication protocol that is different than SSH.

8. The method of claim 1, wherein the target node executes components of multiple applications comprising at least the application, and wherein the multiple applications are owned by different owners.

9. A system, comprising:
a memory;
a processing device communicably coupled to the memory, the processing device to:
execute a Secure Shell (SSH) proxy server as part of a multi-tenant Platform-as-a-Service (PaaS) system;
provide a static uniform resource locator (URL) to a user associated with an application of the multi-tenant PaaS system, the static URL provided in response to the user registering the application with the multi-tenant PaaS system;
receive a request to establish an SSH connection with a component of the application, the component separate from the SSH proxy server, wherein the request to establish the SSH connection comprises the static URL;
authenticate credentials provided as part of the request, the authenticating further comprising the processing device to retrieve a token associated with a user corresponding to the request and store the retrieved token in environment variables maintained by the SSH proxy server for the SSH connection;
establish the SSH connection with a device originating the request, wherein the SSH connection comprises the static URL utilized by the device to communicate with the component via the SSH proxy server;
receive, in view of authenticating the credentials and establishing the SSH connection, routing information for the component of the application from a PaaS master component, the routing information comprising endpoint information of the component of the application, wherein the endpoint information comprises identification of a target node hosting the component in the multi-tenant PaaS system, and wherein the endpoint information changes when the component is hosted by a different node of the multi-tenant PaaS system while the static address remains the same;
receive a second token corresponding to the SSH connection, wherein the second token is different from the first token and is used to authenticate the user to the target node;
in view of successful authentication of the user to the target node using the second token, establish an internal communication session with an executing proxy of the target node, wherein the executing proxy is executed on the target node separate from the component; and
forward information conveyed over the SSH connection to the executing proxy via the internal communication session.

10. The system of claim 9, wherein the processing device is further to authenticate the credentials further comprises the SSH proxy server to communicate with the PaaS master component to authenticate the credentials and utilize the first token to authenticate the user to the executing proxy.

11. The system of claim 10, wherein the routing information is sent from the PaaS master component when the PaaS master component determines that a user associated with the credentials is authorized to access the component of the application.

12. The system of claim 9, wherein the component of the application is a container executing on the target node of the multi-tenant PaaS system, the container launched from an application image providing functionality of the application.

13. The system of claim 9, wherein the component of the application is source code of the application stored in a repository.

14. The system of claim 9, wherein the executing proxy comprises a process executing on the target node, the process to run one or more executables to provide access to the component of the application on the target node.

15. The system of claim 9, wherein the internal communication session utilizes a communication protocol that is different than SSH.

16. A non-transitory machine-readable storage medium including instructions that, when accessed by a processing device, cause the processing device to:
provide, by the processing device executing a Secure Shell (SSH) proxy server, a static uniform resource locator (URL) to a user associated with an application of a multi-tenant Platform-as-a-Service (PaaS) system, the static URL provided in response to the user registering the application with the multi-tenant PaaS system;
receive, by the processing device, a request to establish an SSH connection with a component of the application, the component separate from the SSH proxy server, wherein the request to establish the SSH connection comprises the static URL;
authenticate, by the processing device via the SSH proxy server, credentials provided as part of the request, the authenticating further comprising the processing device to retrieve a token associated with a user corresponding to the request and store the retrieved token in environment variables maintained by the SSH proxy server for the SSH connection;
establish the SSH connection with a device originating the request, wherein the SSH connection comprises the static URL utilized by the device to communicate with the component via the SSH proxy server;

receive, by the processing device via the SSH proxy server in view of authenticating the credentials and establishing the SSH connection, routing information for the component of the application from a PaaS master component that manages applications and component of the PaaS system and is responsible for authentication, authorization, and routing in the PaaS system, the routing information comprising endpoint information of the component of the application, wherein the endpoint information comprises identification of a target node hosting the component in the multi-tenant PaaS system, and wherein the endpoint information changes when the component is hosted by a different node of the multi-tenant PaaS system while the static address remains the same;

receive a second token corresponding to the SSH connection, wherein the second token is different from the first token and is used to authenticate the user to the target node;

in view of successful authentication of the user to the target node using the second token, establish, by the processing device via the SSH proxy server, an internal communication session with an executing proxy of the target node, wherein the executing proxy is executed on the target node separate from the component; and forward information conveyed over the SSH connection to the executing proxy via the internal communication session.

17. The non-transitory machine-readable storage medium of claim 16, wherein the processing device to authenticate the credentials further comprises the processing device to communicate with the PaaS master component to authenticate the credentials and utilize the first token to authenticate the user to the executing proxy.

18. The non-transitory machine-readable storage medium of claim 17, wherein the routing information is sent from the PaaS master component when the PaaS master component determines that a user associated with the credentials is authorized to access the component of the application.

19. The non-transitory machine-readable storage medium of claim 16, wherein the component of the application is at least one of:

a container executing on the target node of the multi-tenant PaaS system, the container launched from an application image providing functionality of the application, or source code of the application stored in a repository.

20. The non-transitory machine-readable storage medium of claim 16, wherein the executing proxy comprises a process executing on the target node, the process to run one or more executables to provide access to the component of the application on the target node.

* * * * *